United States Patent [19]

Dreschmann et al.

[11] Patent Number: 5,042,822
[45] Date of Patent: Aug. 27, 1991

[54] SEAL WITH TWO SEALING RINGS

[75] Inventors: Peter Dreschmann, Dittelbrunn; Wilhelm Walter, Oberthulba/Reith, both of Fed. Rep. of Germany

[73] Assignee: FAG Kugelfischer Georg Schafer KGaA, Fed. Rep. of Germany

[21] Appl. No.: 414,132

[22] Filed: Sep. 28, 1989

[30] Foreign Application Priority Data

Nov. 17, 1988 [DE] Fed. Rep. of Germany ....... 3838824

[51] Int. Cl.⁵ .................... F16J 15/32; F16L 33/78
[52] U.S. Cl. .................................. 277/39; 277/133; 277/152; 277/153; 384/140; 384/485; 384/486
[58] Field of Search .................. 277/35, 37, 38, 39, 277/65, 81 R, 95, 133, 134, 152, 153, 67; 384/139, 140, 481, 485, 486, 484

[56] References Cited

U.S. PATENT DOCUMENTS

| | | | |
|---|---|---|---|
| 3,114,559 | 12/1963 | Miglietti et al. | 277/95 X |
| 3,519,316 | 7/1970 | Göthberg | 384/486 |
| 3,792,912 | 2/1974 | Howe, Jr. et al. | 384/486 X |
| 4,428,586 | 1/1984 | Romero | 277/38 X |
| 4,669,895 | 6/1987 | Colanzi et al. | 384/486 X |
| 4,721,312 | 1/1988 | Hornberger | 277/38 X |
| 4,765,761 | 8/1988 | Umezaki | 277/152 X |
| 4,770,425 | 9/1988 | Colanzi et al. | 277/153 |
| 4,772,138 | 9/1988 | Dreschmann et al. | 277/134 X |
| 4,792,243 | 12/1988 | Takeuchi et al. | 277/152 X |
| 4,906,009 | 3/1990 | Saitoh | 277/133 X |

FOREIGN PATENT DOCUMENTS

| | | |
|---|---|---|
| 32040989 | 12/1983 | Fed. Rep. of Germany . |
| 3404816 | 8/1984 | Fed. Rep. of Germany . |
| 3534130 | 4/1987 | Fed. Rep. of Germany . |
| 3535444 | 4/1987 | Fed. Rep. of Germany . |

*Primary Examiner*—William A. Cuchlinski, Jr.
*Assistant Examiner*—Scott Cummings
*Attorney, Agent, or Firm*—Ostrolenk, Faber, Gerb & Soffen

[57] ABSTRACT

A seal for closing the radial space between two coaxial, radially spaced, relatively rotatable parts. Each of an axially inner and an axially outer sealing ring comprises an approximately L-shaped metal part having sealing lips of elastic plastic material arranged on it. The axially outer sealing ring seated on the radially inward part has a first sealing lip which faces either the interior of the radially outward part or the axial leg of the axially inner sealing ring. To prevent contamination of that first sealing lip, the outer sealing ring has an obliquely outwardly directed fling lip which is radially inward of the first sealing lip and extends approximately into the region of a plane determined either by the axially outer front surface of the axially outwardly extending leg of the inner sealing ring or of the radially outward part. The first sealing lip may also have an obliquely outwardly directed extension located radially inwardly of and extending axially outward of the first sealing lip. Plastic material resting surfaces may be defined on the axial legs of both of the sealing rings. A sealing lip seals the axial space between the sealing rings.

19 Claims, 2 Drawing Sheets

SEAL WITH TWO SEALING RINGS

BACKGROUND OF THE INVENTION

The present invention refers to a seal, for an antifriction bearing, or the like, having axially inner and outer L-shaped sealing rings.

An embodiment of this type of seal is known from Federal Republic of Germany OS 34 04 816. In that embodiment, there is an outer, L-shaped sealing ring which is provided with an additional sealing lip. If that ring is arranged on the rotating machine part or bearing ring, then only part of the impurities in the vicinity of the bearing will be flung away. A large part of the impurities will, however, slide along the radially directed outer surface of the ring, particularly in an environment which is strongly laden with dust, and the impurities will pass into the region of the sealing lip of the sealing ring. The sealing lip is strongly acted on by the continuous action of the dirt, and the lip becomes worn out very rapidly. For example, this frequently occurs in wheel bearings for automotive vehicles. This can then also destroy the inner sealing lip so that dirt and water pass axially into the axial inside of the bearing, which rapidly leads to bearing failure.

In order to reduce the above danger, Federal Republic of Germany Patent 34 45 561 provides another L-shaped sealing ring having sealing lips developed on it which grip from the outside around the outer sealing ring. It has the disadvantage that the dirt can reach the sealing lips, destroy them and then also penetrate inwards. Furthermore, an additional part is necessary.

SUMMARY OF THE INVENTION

The object of the present invention is to provide a seal comprising a plurality of sealing rings which by simple means, ensure insofar as possible, that no impurities can enter into the region of the sealing lip.

In particular, the seal of the invention comprises an axially inner sealing ring and an axially outer sealing ring which seal the radial space between two relatively rotatable, coaxial machine elements, such as a rotatable ring or machine part around another ring, shaft or other machine part. In particular, the radially outer element is the rotatable one. The axially inner sealing ring rotates along with the outer rotatable part and with respect to the inner part, while the axially outer sealing ring is affixed to and is relatively rotatable with or remains stationary with the radially inner part and is effectively relatively rotatable with respect to the outer part. Each sealing ring is comprised of an approximately L-shaped stiff part, which may be comprised of sheet metal. Respective sealing lips comprised of an elastic material, e.g. plastic, are arranged on each of the sealing rings. The axially inner and outer sealing rings are axially spaced apart and are sealed, for example, by a sealing lip particularly on the axially inner sealing ring, which engages the axially outer sealing ring.

The axially outer sealing ring, arranged on the radially inner machine part, has a sealing lip defined at its radial exterior which engages the radially outer rotating part of which engages the radial outward axial leg of the inner sealing ring if that axial leg extends axially outward far enough to extend past that sealing lip on the axially outer sealing ring. To prevent contamination of that sealing lip on the axially outer sealing ring, the axially outer sealing ring has an obliquely outwardly directed projection in the form of a fling lip extending outwardly from it. In particular, that fling lip extends approximately axially outward into the region of a plane which is determined by the outer front surface of the inner sealing ring, that is the maximum axially outward extent of the inner sealing ring, or that extends out to the axially outward side of the outer rotatable part, whichever is axially further outward.

To further protect the sealing lip of the outer sealing ring, it has arranged on its radially outward and axially outward free end an additional obliquely outwardly directed extension which is both radially inward of the engagement between that sealing lip and the outer rotatable part and which extends axially outwardly therefrom.

When the L-shaped sheet metal part of the axially inner sealing ring has an axial leg that is of sufficient axial length to extend axially outward past the axially outward front face of the outer rotatable part, that L-shaped leg terminates in a radially outwardly directed flange which is spaced from the axially outward front face of the outer rotatable part by a distance defining a circumferential slot around the outer rotational part and the seal.

For assuring good holding of the sealing rings and good sealing, each may be provided with a resting surface of plastic or the like elastic material on the radial exterior of the axial leg thereof to rest against the facing interior surfaces of the inner and outer relatively rotatable parts.

In order to produce a flinging action, it is necessary to develop the obliquely outwardly directed projection, i.e. a fling lip, on the outer sealing ring. The dirt is possibly mixed with water. As a result of centrifugal force, the dirt and water normally would flow radially outward along the front surface of the outer sealing ring. But, the projection causes the mixed dirt to be flung off before it arrives at the adjacent sealing lip. That sealing lip is thereby additionally protected and thus has a substantially longer life, without reduction of its sealing action. This further protects the inner sealing lips to a great extent, which also results in a longer life.

In order that the fling lip not be damaged or destroyed in either its installed or its uninstalled conditions, that lip does not extends beyond the plane which is determined by the axially outer or front side of the part in which a corresponding sealing ring is installed.

In a preferred embodiment, an outwardly directed extension can also be arranged on the sealing ring and particularly on the free end of the outer sealing ring. This provides additional protection for the adjacent sealing lip.

In order substantially to prevent the return of the flung off dirt into the region of the seal, it is advisable to provide an additional radially directed flange on the L-shaped metal part of the inner sealing ring. If the flange is spaced by a gap from the front surface of the outer part, a collection groove for the dirt is formed there. The dirt will then flow off in the groove and drop off in the lower region under the influence of gravity.

In order for a dependable seal with respect to the facing part to be present also in the region of the axially directed arms of the sealing rings, it is advisable to provide a resting surface of plastic on the wall and bore surfaces thereof, at least in axial sections thereof. This prevents the entry of dirt at this place.

Other objects and features of the invention are explained below with reference to the drawings.

DESCRIPTION OF THE PREFERRED EMBODIMENTS

Figure 1:
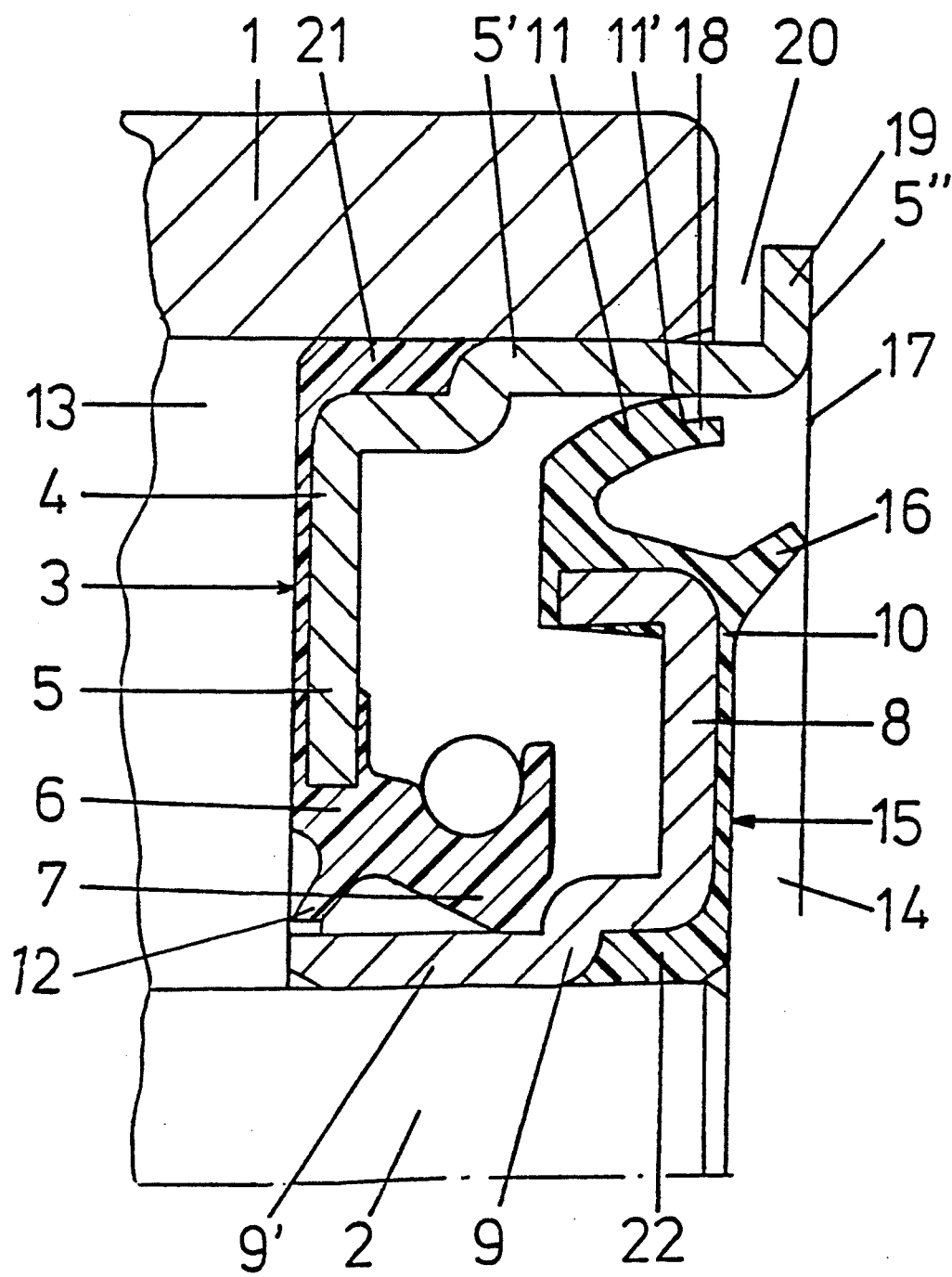
FIG. 1 is a partial cross-section through a seal in accordance with the invention.

Referring to FIG. 1, a seal 3 is provided between the outer machine part or outer ring 1 and the rotating shaft 2. The seal is comprised of an axially inner sealing ring 4, which is formed of a generally L-shaped, stiff, sheet metal part 5 and of a more flexible and resilient, elastic plastic covering 6, which includes a sealing lip 7 and which is vulcanized on the metal part 5. The inner sealing ring is secured to the outer machine part 1 to rotate with it with respect to both the shaft 2 and the outer sealing ring 8 of the seal. The seal is also comprised of an axially outer sealing ring 8 which is also formed of a generally L-shaped, stiff, sheet metal part 9, which is seated on the rotating shaft 2 and is stationary with or rotates along with it. The ring 8 also includes a flexible, resilient, elastic plastic covering 10, which includes the outer sealing lip 11, and which is vulcanized on the metal part 9. A good sealing off of the axially inner space 13 axially inward of the seal is obtained by the radially inward sealing lip 7 and by the radially outward sealing lip 11.

Particularly when a seal 3 is used in the wheel bearing of a motor vehicle, a large amount of dirt and water is present in the axially outer region 14 outward of the seal 3. When the axially outer sealing ring 8 is the rotating machine part, these impurities travel radially outward along the front surface 15 of the outer sealing ring 8. In order to protect the sealing lip 11 at the radially outward edge of the axially outer ring, an obliquely radially and axially outwardly directed, flexible and resilient projection 16 is arranged generally toward the radial central region of the outer sealing ring 8 of the vulcanized plastic part 10. That projection 16 acts as a dirt flinging lip and prevents impurities from traveling radially further outward to the sealing lip 11. The lip 11 is therefore less stressed and has a considerably longer lift without a decline in its sealing action. Since the projection 16 should have the greatest possible dirt flinging effect while, on the other hand, it should be projected by adjacent machine parts, the projection 16 extends axially up to a plane 17 which is defined by the axially outer front surface 5" of the inner sealing ring 4.

In order that any impurities which might still arrive at the radially outward tip 11' of the sealing lip 11 be instead kept away from the lip 11, an obliquely radially and axially outwardly directed projection 18 is provided radially inward of but extending axially outward of the lip 11, and this also acts as a flinging lip.

Since the impurities which are flung off are to be kept away as effectively as possible, the L-shaped sheet metal part 5 of the axially inner sealing ring 4 has its axially projecting part provided with a radially outwardly directed flange 19 on its axially outer edge. This flange faces the front surface of the outer part 1 of the bearing and is spaced from it by a circumferential gap 20.

The dirt which collects in this region at the outside of the outer part is therefore kept away from the sealing lip 11 also from the outside since it is collected in the groove formed by the slot 20 and is led away downward where it drops off under the influence of gravity.

In order to prevent penetration of dirt into the axially inner space 13, in the regions of the respective radially outward and inward seating sections of the sheet metal parts 5 and 9, the respective radially outward and inward oppositely facing surfaces of the respective axially directed arms 5' and 9' of the sheet metal parts 5 and 9 may include resting surfaces 21 and 22 of resilient plastic over parts of their lengths and particularly the parts near their respective L-bends.

In order to keep the lubricant as much as possible within the inner space 13, another sealing lip 12 is arranged on the axially inward side of the axially inner sealing ring 4. Because of the gap toward the sheet metal part 9, it permits equalization of pressure toward the outside but substantially holds the lubricant back in the inner space.

Figure 2:
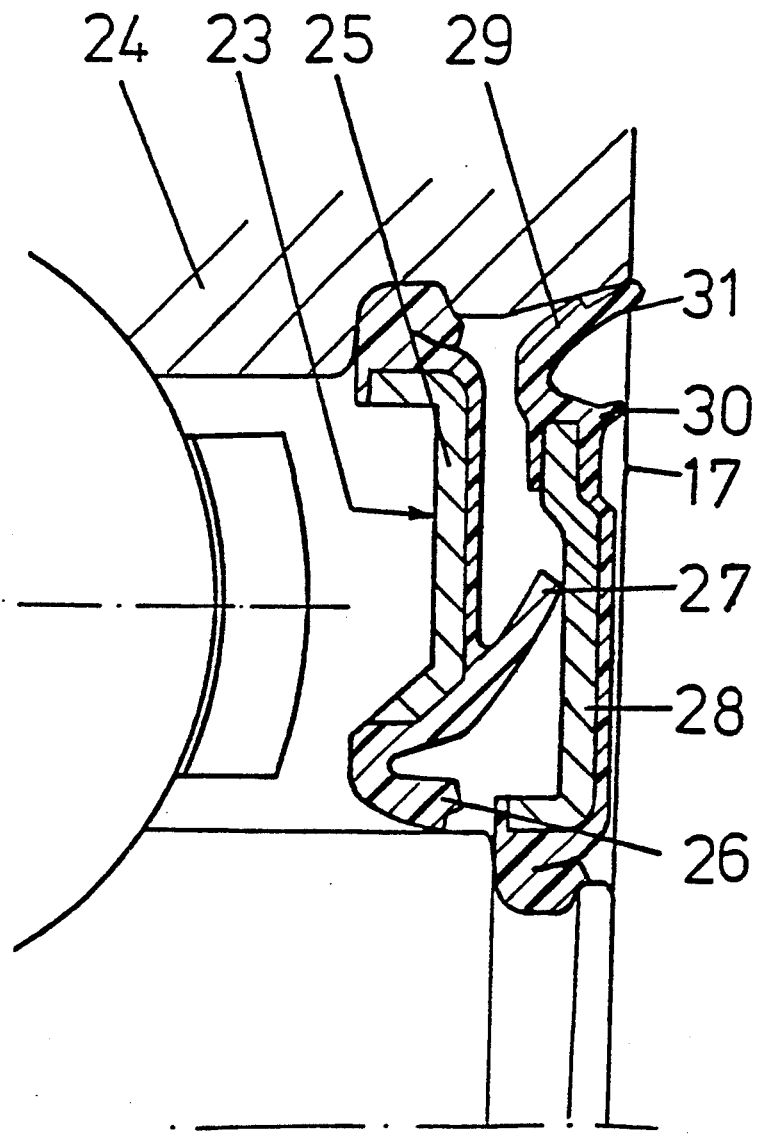
FIG. 2 shows a variant of the seal of FIG. 1.

The seal 23 of the embodiment of FIG. 2 is an axially more compact embodiment than the seal embodiment in FIG. 1. Otherwise however, identically functioning features are provided. The axially inner sealing ring 25 is arranged in the outer ring 24 of a ball bearing. Ring 25 has two sealing lips 26 and 27. Lip presses on the radially inward inner shaft of the bearing. Lip 27, like lip 7, presses on the inside of the other axially outer sealing ring and defines a seal between the rings. A radially outer sealing lip 29 of the axially outer sealing ring 28 lies against the radially inner wall surface of the outer machine part or outer ring 24. For protection of the lip 29, the radially more centrally located axially outward projection 30 is provided on the sealing ring 28 and acts like the lip 16. Similarly, an extension 31 is provided at the sealing lip 29 radially inward of and axially outward of that lip and acts like the lip 18.

Although the present invention has been described in relation to particular embodiments thereof, may other variations and modifications and other uses will become apparent to those skilled in the art. It is preferred, therefore, that the present invention be limited not by the specific disclosure herein, but only by the appended claims.

What is claimed is:

1. A seal for being disposed between two concentric relatively rotatable parts which are radially spaced apart, the seal being disposed inside of and for sealing the radial space between the relatively rotatable parts, the seal comprising:

an axially inner sealing ring located axially more inward of the axial ends of the space to be sealed; an axially outer sealing ring, located axially outward of the inner sealing ring; the outer sealing ring being secured to a first one of the relatively rotatable parts for rotating with the one part and with respect to the second relatively rotatable part; the inner sealing ring being secured to the second, other relatively rotatable part for rotating with the second rotatable part with respect to the first relatively rotatable part; each of the sealing rings including a leg extending generally radially across the radial space;

the axially outer sealing ring including a sealing lip of elastic material which extends to an engages the second relatively rotatable part for defining a seal there as the outer sealing ring rotates with respect to the second part;

an oblique projection in the form of an annular fling lip defined on the outer sealing ring, said projection being directed both radially and axially outwardly and extending approximately into the region of a plane of the axially outermost part of the seal and of the axial outer end of the second relatively rotatable part to which the outer sealing ring is sealed; the axially outer sealing ring includes a stiff part which extends generally radially across the radial space, the elastic sealing lip being formed over the stiff part, the elastic sealing lip comprising the fling lip.

2. The seal of claim 1, further comprising respective sealing lips of elastic material, including the first mentioned elastic sealing lip, the sealing lips being formed over the sealing rings.

3. The seal of claim 2, wherein the sealing rings include stiff parts supporting the sealing lips that are thereover.

4. The seal of claim 1, wherein each of the sealing rings includes an approximately L-shaped stiff part, including a first leg of the L extending generally radially across the radial space and a second leg of the L extending generally axially; the axial leg of the outer sealing ring being at the first relatively rotatable part, and the axial leg of the inner sealing ring being at the second relatively rotatable part;

respective sealing lips of elastic material, including the first mentioned sealing lip, being formed over the L-shaped stiff parts of the sealing rings.

5. The seal of claim 4, wherein the stiff part of each sealing ring is a respective sheet metal part.

6. The seal of claim 4, wherein the sealing lips of elastic material are comprised of an elastic plastic material.

7. The seal of claim 4, wherein the L-shaped inner sealing ring is so shaped that the axially extending leg thereof extends axially outward past the sealing lip of the inner sealing ring, so that the inner sealing ring seals against the second relatively rotatable part by sealing against the axially extending leg of the outer sealing ring.

8. The seal of claim 4, wherein the inner sealing ring extends axially outward a shorter distance than the location of contact of the sealing lip of the outer sealing ring, so that the sealing lip of the outer sealing ring is axially outward of the axial leg of the inner sealing ring and the sealing lip of the outer sealing ring engages the interior of the second relatively rotatable part.

9. The seal of claim 1, wherein the axially inner and outer sealing rings are axially spaced apart and there is a second sealing lip extending from one of the sealing rings to the other of the sealing rings, for sealing the axial space between them.

10. The seal of claim 9, wherein the second sealing lip extends from the axially inner sealing ring to engage the axially outer sealing ring.

11. The seal of claim 4, wherein the first sealing lip is on the free axial outward end of the outer sealing ring.

12. The seal of claim 11, further comprising an obliquely, axially and radially outwardly directed extension in the form of a fling lip located on the outer sealing ring, and starting radially slightly inwardly from the first sealing lip and extending axially outwardly therefrom.

13. The seal of claim 4, wherein the axially extending leg of the inner sealing ring extends axially outward far enough to extend beyond the outer axial end of the second relatively rotatable part and to have a radially outwardly directed flange defined which is axially spaced from the axially outward front surface of the second relatively rotatable part and defining a circumferential slot between them.

14. The seal of claim 4, further comprising the first rotatable part being an inner part and the second rotatable part being an outer part radially outward of the inner part and relatively rotatable with respect thereto.

15. The seal of claim 4, wherein the axially extending arms of the generally L-shaped sealing rings have respective resting surfaces of plastic material, and each resting surface is resting against the interior of the respective relatively rotatable part for that respective sealing ring.

16. The seal of claim 15, wherein the resting surfaces are generally disposed along the axial legs of the L-shaped sealing ring and generally located toward the junction of the axial and radial legs of the L-shaped sealing rings.

17. The seal of claim 1, wherein the first sealing lip is on the free axial outward end of the outer sealing ring.

18. The seal of claim 17, further comprising an obliquely, axially and radially outwardly directed extension in the form of a fling lip located on the outer sealing ring, and starting radially slightly inwardly from the first sealing lip and extending axially outwardly therefrom.

19. The seal of claim 1, wherein the stiff part is formed by metal, the fling lip being formed of a plastic material which is more flexible than the metal.

* * * * *